Oct. 24, 1950          W. L. SMITH          2,527,280

CONTROL SYSTEM FOR ELECTRORESPONSIVE DEVICES

Filed Nov. 29, 1946

INVENTOR.
WARD L. SMITH
BY
Oberlin & Limbach
ATTORNEYS.

Patented Oct. 24, 1950

2,527,280

UNITED STATES PATENT OFFICE 2,527,280

CONTROL SYSTEM FOR ELECTRORESPONSIVE DEVICES

Ward L. Smith, Hudson, Ohio, assignor to The Electric Controller & Mfg. Company, a corporation of Ohio Application November 29, 1946, Serial No. 713,013

5 Claims. (Cl. 175—335)

This invention relates to control systems for selectively actuating electroresponsive devices at a controlled station from a remote or relatively moving controlling station, and more particularly to an alternating current operated selective control system using a minimum number of control conductors between the controlling and the controlled stations.

Remote control systems for use with direct current are known in which two electromagnetic switches or relays at a controlled station have their operating windings connected in series across positive and negative power conductors and in which a single control conductor extends from a point between the two windings to a remote controlling station at which means are provided to connect the control conductor selectively to the positive and negative power conductors and to disconnect the control conductor from both of the power conductors. When the remote end of the control conductor is not connected to the power conductors, each of the windings is subjected to one-half of the voltage between the power conductors.

In one form of this type of direct current operated control system the switches are designed so as to be in their dropped-out positions when the control conductor is disconnected from the power conductors. Connection of the remote end of the control conductor to one of the power conductors causes the full voltage between the power conductors to be applied to one of the windings and causes the voltage across the other one of the windings to be reduced to zero. Under these conditions, the deenergized switch remains in its dropped-out position and the other switch picks up. If the control conductor is connected to the other power conductor, the electrical condition of the two windings is reversed and consequently the switch that was picked-up drops out and the other switch picks up. Disconnection of the control conductor from either of the power conductors causes the switch that was picked up to return to its initial dropped-out position and the other switch to remain in its dropped-out position.

In another form of the foregoing type of direct current control system, the switches are designed so as to be in their picked-up positions when the remote terminal of the control conductor is disconnected from the power conductors. With both switches picked-up, connection of the remote end of the control conductor to one of the power conductors caused the full voltage between the power conductors to be applied to one of the windings so that the switch operated by that winding remains picked-up, and causes the voltage across the other one of the windings to be reduced to zero so that the switch operated by that winding drops out. When the control conductor is connected to the other power conductor, the electrical condition of the two windings is reversed and consequently the switch that was picked-up drops out and the other switch picks up. After the control conductor is again disconnected from both of the power conductors, both of the switches are in their initial picked-up positions.

Both forms of the direct current control system described above are capable of positive operation even though the voltage of the power conductors varies throughout the wide range common in systems wherein power is transmitted through relatively movable conductors such as trolley bars and cooperating trolley wheels or shoes. It is desirable to have available for use in either polyphase or single phase alternating current control applications a control system as simple as the foregoing direct current control system, neither form of which is operable reliably when the power conductors are energized with alternating current instead of direct current.

The unreliable operation that results when alternating current is used is due to the fact that the impedance of the operating winding of an alternating current switch of the electromagnetic type is much less when the switch is dropped-out than when the switch is picked up. For example, if the power conductors in the first of the foregoing forms of the direct current control system are energized with alternating current, a switch that has picked up due to the connection of the remote terminal of the control conductors to one of the power conductors is apt not to drop out upon disconnection of the control conductor from the power conductor and the switch that was in its dropped-out position might flutter or actually pick up. Since the terminal of the control conductor must travel over an insulating space when moving from one power conductor to the other in order to avoid any possibility of a direct electrical connection between the two power conductors, this unpredictable operation can result even if the disconnected position of the control conductor is not used as an actual control position. As to the second form of the direct current control system when used with alternating current, the undesirable effects of the impedance changes of the operating windings are not only augmented, but there is no assurance that both switches will pick-up when the power conductors are first energized since one of the switches might start to close ahead of the other and in so doing increase the impedance of the circuit to prevent closure of the other switch. The unreliable operation in both instances is of course aggravated when the line voltage is not constant.

An object of this invention is to provide an improved alternating current operated selective control system using a minimum number of control conductors and having none of the foregoing disadvantages.

A general object is to provide an improved control system for selectively operating alternating current electro-responsive devices through a minimum number of control conductors.

Other objects are: to provide a simplified system for selectively controlling the operation of a plurality of alternating electro-responsive devices from a distant or a relatively movable controlling station through a single control conductor, to provide a single phase alternating current remote control system for selectively operatively energizing a pair of windings which is simple in construction and reliable in operation, to provide an improved control system in which a plurality of alternating current operated electroresponsive devices are selectively controlled by changing the energization of a single control conductor, and to provide an improved alternating current control system operable through a minimum number of control conductors which is insensible to voltage variations of the usual magnitude experienced in systems wherein power is transmitted through relatively movable conductors.

A more specific object is to provide a control system comprising a control unit having electro-responsive windings to be operatively energized selectively according to which side of a source of alternating current a single control conductor common to said windings is connected and which system further includes a condenser in circuit with the windings to render their operative energization dependent upon selective connection of the control conductor to opposite sides of the source.

In accordance with this invention, a pair of electroresponsive devices such as electromagnetic switches or relays have their operating windings connected in series with each other across a pair of power conductors leading from opposite sides of a source of single phase alternating current. The operating windings of the devices may have a considerably lower impedance when the devices are in their non-operated or dropped-out positions than when the devices are in their operated or picked-up positions. A control conductor common to the two windings and connected to the series circuit at a point intermediate of the two windings extends to a remote or relatively moving controlling station at which means are provided to connect the control conductor selectively to the power conductors or to disconnect the control conductor from both power conductors. The devices are so designed that, when the control conductor is disconnected from the power conductors, neither device moves to or remains in its operated position even though the voltage between the power conductors is considerably above the rated voltage of the system. A negative reactance or capacitive device such as a condenser is interposed in the control conductor or between the control conductor and the power conductors and has a reactance so related to the reactance of the operating windings that, due to a phenomenon of series resonance, as distinguished from actual resonance, a selected one of the two devices moves to its operated position when the control conductor is connected to one of the power conductors even though the voltage between the power conductors is considerably below its rated value. The phenomenon of series resonance is the reduction in impedance of an inductively reactive circuit which occurs when a condenser of less reactance than the inductive reactance is inserted in series therewith. Disconnection of the control conductor from the power conductor permits the operated device to return to its normal non-operated position. When the control conductor is connected to the other power conductor, the other of the two devices moves to its operated position. When either of the devices is in its operated position, the winding of the operated device is in series with the condenser and the winding of the non-operated device is in parallel with the condenser. Actual series resonance is not obtained, the series circuit including the winding of the operated device and the condenser being maintained inductively reactive so that the voltage drop across the winding of the operated device is larger than that across the condenser.

Other objects and advantages of this invention will become apparent from the following description wherein reference is made to the drawings, in which.

Figure 1:
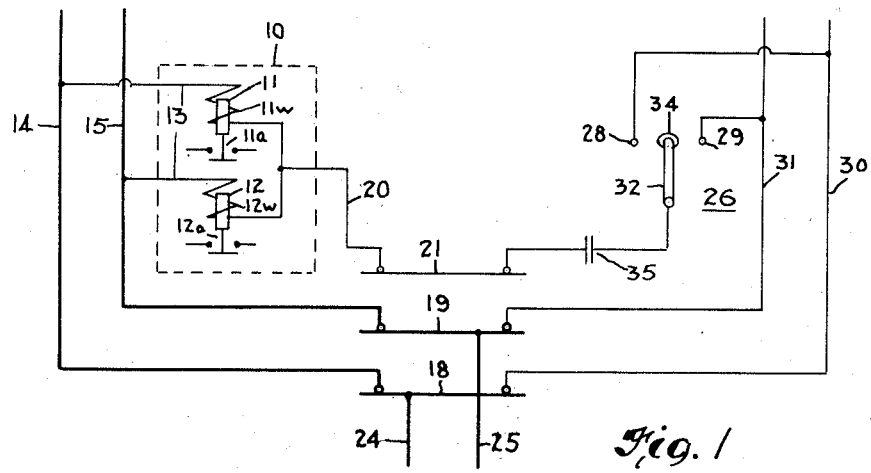
Fig. 1 is a wiring diagram of a preferred embodiment of the invention.

Referring to Fig. 1, a control unit 10 comprises a pair of electromagnetic responsive devices to be selectively operated and shown by way of example as alternating current relays 11 and 12. The relays 11 and 12 have operating windings 11w and 12w, respectively, which are connected in series with each other in a control circuit 13 which in turn is connected across power conductors 14 and 15. The power conductors 14 and 15 may be energized by connection through trolley wheels to trolley bars 18 and 19, respectively, and are arranged to supply apparatus (not shown) to be controlled by the control unit 10. As shown, the circuit 13 connects one terminal of the winding 11w to the conductor 14 and one terminal of the winding 12w to the conductor 15. The other terminals of the windings 11w and 12w are interconnected with each other to complete the control circuit 13 and are connected through a common control conductor 20 and a trolley wheel to a trolley bar 21. The trolley bars 18 and 19 are fixedly connected to power conductors 24 and 25, respectively, which are arranged to be energized from opposite sides, respectively, of a source of single phase alternating current (not shown).

A pilot contact device such as a master switch 26 for selectively controlling the relays 11 and 12 comprises spaced contact segments 28 and 29 which may be connected directly to the power conductors 24 and 25, respectively. As shown the segments 28 and 29 are connected through conductors 30 and 31, respectively, and trolley wheels to the trolley bars 18 and 19, respectively. A movable contact arm 32 of the master switch 26 is connected through a trolley wheel to the trolley bar 21 and is arranged to be selectively engageable with the contact segments 28 and 29 and a dead block or off point segment 34. Although the invention is described herein in connection with a control system in which the control unit or controlled station is movable relative to the pilot device or controlling station and in which both stations are movable relative to the supply source, it is obvious that the invention possesses advantages as well even if the two stations are not relatively movable.

In accordance with this invention, a capacitive device such as a condenser 35 of suitable reactance relative to the inductive reactance of the windings 11w and 12w is interposed in the connection between the arm 32 and the trolley bar 21. As will become apparent, the condenser 35 could be interposed in the common control conductor 20 instead of between the arm 32 and the trolley bar 21.

The relays 11 and 12 are exemplary of electroresponsive devices which have operated and non-operated positions or conditions and which when in their operated conditions may have a greater impedance to the flow of alternating current than when in their non-operated conditions. For illustrative purposes the relays 11 and 12 are shown as being held in their normal or non-operated position by gravity and as having normally open contacts 11a and 12a, respectively, but it is to be understood that other contact arrangements may be provided and that, instead of relays, solenoid valves or other devices could be selectively controlled. As hereinafter used, the term pick-up voltage refers to that minimum value of voltage across the respective windings which causes the relays 11 and 12 to move from their non-operated to their operated conditions, and the term drop-out voltage refers to that minimum value of voltage across the respective windings which holds the relays 11 and 12 in their operated conditions.

With the arm 32 of the master switch 26 in engagement with the dead block 34 or out of engagement with the contact segments 28 and 29, each of the operating windings 11w and 12w is subjected to a fractional part of the alternating voltage between the conductors 14 and 15. The relays 11 and 12 are preferably substantially identical in design, and if both are in their non-operated conditions as shown, the voltage across each winding 11w and 12w is equal to one-half of the voltage across the conductors 14 and 15. If one of the relays 11 or 12 should be in its operated position under these conditions, the voltage distribution between the windings is unequal if the impedance of the winding of the operated relay is greater than that of the non-operated relay. However, the relays are so designed that the relay having the higher voltage across its operating winding returns to its non-operated condition even though the voltage between the conductors 14 and 15 is at its highest possible normal value and the arm 32 is in engagement with the segment 34. Thus, so long as the arm 32 is disengaged from the contact segments 28 and 29, both relays 11 and 12 are in their non-operated conditions even though the maximum possible voltage exists across the conductors 14 and 15. In many industrial applications using alternating voltage it is not uncommon or considered abnormal for the voltage of supply conductors such as the conductors 24 and 25 to vary as much as ten per cent above and fifteen per cent below the rated voltage of the system. Because of the variable impedance between trolley wheels and bars and because of the variable distance between the control unit 10 and the master switch 26, voltage variations of twenty per cent below the rated value between conductors such as the conductors 14 and 31 and 15 and 30 are considered as normal variations.

If the condenser 35 were not connected in the circuit, movement of the arm 32 into engagement with one or the other of the contacts 28 and 29 would not cause positive operation of the relays 11 and 12 if the voltage between the conductors 24 and 25 should be at its lowest possible normal value or if the voltage between the conductors 14 and 31 or between the conductors 15 and 30 were at the lowest possible normal value. This is because selection of the pick-up and drop-out voltage values of the relays 11 and 12 to prevent false operation when the windings 11w and 12w are connected in series across the conductors 14 and 15 causes the pick-up value of the relays to be so high that neither relay picks up when connected directly between the conductors 14 and 31 or 15 and 30 unless the voltage between those conductors is substantially above the lowest possible normal value.

However, when the condenser 35 is effective in the circuit, the reactance of the selected relay circuit is decreased so that positive pick-up of the selected relay is possible even though the voltage between the conductors 14 and 31 or between the conductors 15 and 30 is at the lowest possible normal value.

Considering the operation of the control system of Fig. 1, the relays 11 and 12 are both in their non-operated condition when the arm 32 is disengaged from both of the contact segments 28 and 29. To cause the relay 11 to shift from its non-operated condition to its operated condition, the arm 32 is moved into engagement with the segment 29. A circuit is thereby completed from the conductor 24 through the trolley bar 18, the conductor 14, the winding 11w, the conductor 20, the trolley bar 21, the condenser 35, the arm 32, the segment 29, the conductor 31, and the trolley bar 19 to the conductor 25. Because of the capacitive reactance of the condenser 35, the impedance of this circuit is so reduced while the relay 11 is in its non-operated condition that, even under conditions of extremely low voltage, the voltage across the winding 11w exceeds the pick-up value. If the device represented by the relay 11w is of the type that increases in reactance upon movement to its operated condition, the impedance of the circuit traced above increases upon operation of the relay 11 but not to such an extent as to cause the voltage across the winding 11w to decrease below the drop-out value.

Movement of the arm 32 from the segment 29 permits the relay 11 to return to its non-operated position as described above. To cause operation of the relay 12, the arm 32 is moved into engagement with the segment 28 thereby to complete a circuit from the conductor 25 through the trolley bar 19, the conductor 15, the winding 12w, the conductor 20, the trolley bar 21, the condenser 35, the arm 32, the segment 28, the conductor 30 and the trolley bar 18 to the conductor 24.

It is to be noted that when the winding 11w is operatively energized, the winding 12w is connected in parallel with the condenser 35; and that when the winding 12w is operatively energized, the winding 11w is connected in parallel with the condenser 35. The voltage across the condenser, however, does not approach the pick-up voltage value of the relays even though the maximum possible normal voltage may exist between the conductors 14 and 31 or between the conductors 15 and 30.

Figure 2:
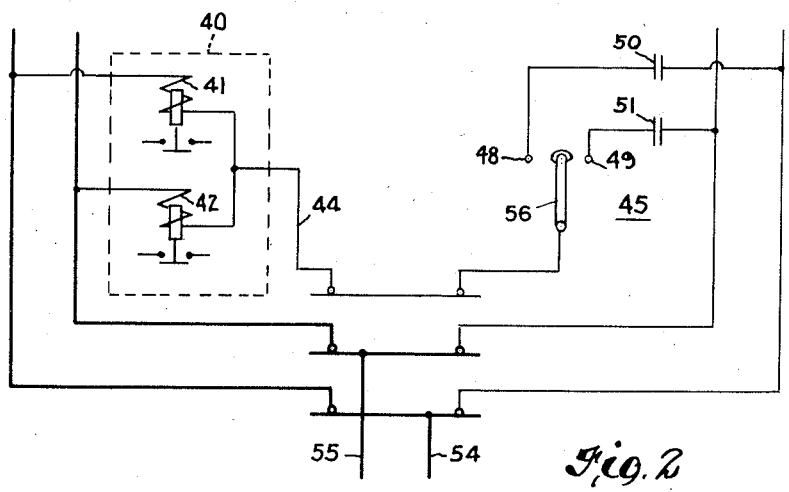
Fig. 2 is a wiring diagram of a modification.

In the modification of Fig. 2, a control unit 40 has a pair of electroresponsive windings 41 and 42 to be selectively controlled through a common conductor means 44 by a master switch 45. The master switch 45 has contact segments 48 and 49 connected through respective condensers 50 and 51 to opposite sides of a source of alternating current represented by conductors 54 and 55. If an arm 56 of the master switch 45 is in the off position shown, the windings 41 and 42 are connected in series across the conductors 54 and 55, but the windings are not operatively energized under these conditions. When the contact arm 56 engages the segment 49, the winding 41 is connected across the source in series with the condenser 51 and the winding 42 is connected in parallel with the condenser 51. The winding 41 is operatively energized under these conditions and the winding 42 is not operatively energized. When the arm 56 engages the segment 48, the winding 42 is connected across the source in series with the condenser 50 and the winding 41 is connected in parallel with the condenser 50. The winding 42 is operatively energized under these latter conditions and the winding 41 is not operatively energized. In event of a short circuit between the segments 48 and 49, the short circuit current is effectively limited by the condensers 50 and 51.

The foregoing description of two illustrative embodiments of the invention points out a series of electrical relationships which, if maintained, make possible the proper combination of electromagnetic relays and a condenser, or condensers, to provide the desired operation when interconnected with and by means of a pilot control device in the manner set forth. Innumerable combinations of relays and condensers may be selected to construct the invention, depending upon the characteristics of the power source and result and size of equipment desired, and consequently the numerical values hereinafter given for the electrical quantities involved for a specific examplary structure are not to be considered as limiting the scope of the invention.

As an example, if the source is one of 220 volts at 60 cycles per second, two identical clapper type electromagnetic relays of conventional design may be used with a single 10 microfarad condenser as in Fig. 1 or with two 10 microfarad condensers as shown in Fig. 2. Since the relays are identical, a description of one applies to both. The specific relay is provided with a set of double-break contacts as shown in Fig. 1 and 2 and has a coil wound with 4500 turns of number 29 enameled wire. The resistance of this coil is 145 ohms at 32 degrees centigrade. The relay armature is biased to contact-open position by a spring which is adjustable by means of a spring guide stud located on the relay base. The spring adjustment is not critical and satisfactory operation is obtained over a wide range within the extreme limits given in the following table of the test characteristics of the relay at 60 cycles per second.

|  | Armature Spring Adjustment | |
|---|---|---|
|  | Minimum Force | Maximum Force |
| Minimum pick-up volts | 155 | 254 |
| Minimum pick-up amperes | 0.170 | 0.285 |
| Dropout voltage (to full open position) | 124 | 160 |
| *Armature and Contacts Open* | | |
| Inductance in henries at pick-up voltage | 2.38 | 2.34 |
| Inductance in henries at dropout voltage | 2.6 | 2.55 |
| Amperes at drop-out voltage | 0.125 | 0.165 |
| *Armature and Contacts Closed* | | |
| Inductance in henries at pick-up voltage | 3.82 | 3.8 |
| Inductance in henries at drop-out voltage | 4.35 | 4.23 |
| Amperes at drop-out voltage | 0.075 | 0.10 |

Any pair of relays each having approximately the foregoing operating characteristics can be used with a 10 microfarad condenser for 220 volt, 60 cycle applications. For 110 volt, 60 cycle applications the same relays can be used if the coils are replaced by coils each having 2250 turns of number 26 enameled wire and the condenser or condensers changes to 40 microfarads. For 440 volt, 60 cycle applications, relay coils of 9000 turns of number 32 enameled wire may be used with a condenser or condensers of 2.5 microfarads.

Other modes of applying the principle of the invention may be employed, change being made as regards the details described, provided the features stated in any of the following claims or the equivalent of such be employed.

I therefore particularly point out and distinctly claim as my invention:

1. In a control system having a pair of conductors and adapted to be energized by an alternating voltage of predetermined frequency and of predetermined normal value through said pair of conductors, a pair of electromagnetic devices each having a picked-up and dropped-out position and each having an operating winding the impedance of which increases when the associated device changes from its dropped-out to its picked-up position, each of said devices being operative to change from its dropped-out to its picked-up position only when the voltage impressed on its associated winding is above a predetermined minimum voltage value and being operative to change from its picked-up to its dropped-out position only when the voltage impressed on its associated winding is below a predetermined maximum voltage value less than said minimum voltage value, said windings being connected in a circuit in series with each other across said pair of conductors, said predetermined minimum and maximum voltage values being so related to said alternating voltage that, when said circuit is connected across said conductors, said devices remain in their dropped-out position and if one or both is in its picked-up position, the device or devices, return to the respective dropped-out positions, a capacitive means, and switch means operatively associated with said circuit and said capacitive means and arranged to connect said capacitive means between a point on said circuit intermediate of said windings and either of said conductors, selectively, whereby a selected one of said windings is connected in series with said capacitive means and the other one of said windings is connected in parallel with said capacitive means across said conductors, and the capacitance of said capacitive means being so related to the inductance of said windings and to the frequency of said alternating voltage that the voltage across the selected winding is above said predetermined minimum value and the voltage across the other one of said windings is below said predetermined maximum value when said switch means is operated.

2. The structure of claim 1 characterized in that said switch means is also arranged to disconnect said capacitive means from operative connection with respect to both of said windings.

3. The structure of claim 1 characterized in that said switch means comprises a pair of contact means and said capacitive means comprises a pair of condensers connected one in a circuit between one of said contact means and one of said conductors and the other in a circuit between the other of said contact means and the other of said conductors.

4. The structure of claim 1 characterized in that said electromagnetic devices have substantially identical electrical characteristics.

5. A control system adapted to be energized from a source of alternating current and comprising a pair of conductors connected to a source of alternating current, a pair of electromagnetic devices each having a picked-up and dropped-out position and each having an operating winding the impedance of which increases when the associated device changes from its dropped-out to its picked-up position, each of said devices being operative to change from its dropped-out to its picked-up position only when the voltage impressed on its associated winding is above a predetermined minimum voltage value and being operative to change from its picked-up to its dropped-out position only when the voltage impressed on its associated winding is below a predetermined maximum voltage value less than said minimum voltage value, said windings being connected in a circuit in series with each other across said pair of conductors, said predetermined minimum and maximum voltage values being so related to the voltage and frequency impressed on said conductors that said devices remain in their dropped-out position and if one, or both, is in picked-up position the device, or devices, returns to dropped-out position, a capacitive means, and switch means operatively associated with said circuit and said capacitive means and arranged to connect said capacitive means between a point on said circuit intermediate of said windings and either of said conductors, selectively, whereby a selected one of said windings is connected in series with said capacitive means and the other of said windings is connected in parallel with said capacitive means across said conductors, and the capacitance of said capacitive means being so related to the inductance of said windings and to said frequency that the voltage across the selected winding is above said predetermined minimum value and the voltage across the other one of said windings is below said predetermined maximum value when said switch means is operated.

WARD L. SMITH.

REFERENCES CITED

The following references are of record in the file of this patent:

UNITED STATES PATENTS

| Number | Name | Date |
|---|---|---|
| 2,232,257 | Myles | Feb. 18, 1941 |
| 2,467,901 | McArthur | Apr. 19, 1949 |

FOREIGN PATENTS

| Number | Country | Date |
|---|---|---|
| 602,989 | Germany | Sept. 20, 1934 |